United States Patent
Baniamerian et al.

(10) Patent No.: US 11,876,705 B2
(45) Date of Patent: Jan. 16, 2024

(54) METHODS AND SYSTEMS FOR ADAPTIVE STOCHASTIC-BASED LOAD BALANCING

(71) Applicants: Amir Baniamerian, Montreal (CA); Xingjun Chu, Ottawa (CA); Mohammed El Azzab, Ottawa (CA); Salaheddine Hamadi, Ottawa (CA)

(72) Inventors: Amir Baniamerian, Montreal (CA); Xingjun Chu, Ottawa (CA); Mohammed El Azzab, Ottawa (CA); Salaheddine Hamadi, Ottawa (CA)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 17/553,741

(22) Filed: Dec. 16, 2021

(65) Prior Publication Data
US 2023/0198895 A1 Jun. 22, 2023

(51) Int. Cl.
*H04L 45/122* (2022.01)
*H04L 45/00* (2022.01)
*H04L 47/10* (2022.01)

(52) U.S. Cl.
CPC ............ *H04L 45/38* (2013.01); *H04L 45/122* (2013.01); *H04L 47/29* (2013.01)

(58) Field of Classification Search
CPC ....... H04L 45/38; H04L 45/122; H04L 47/29; H04L 45/125; H04L 45/22; H04L 45/24; H04L 47/11; H04L 47/122; H04L 47/125
See application file for complete search history.

(56) References Cited

U.S. PATENT DOCUMENTS

| | | | | |
|---|---|---|---|---|
| 9,608,913 | B1 * | 3/2017 | Kabbani | H04L 47/125 |
| 10,855,593 | B1 * | 12/2020 | Leib | H04L 43/0882 |
| 2008/0240711 | A1 * | 10/2008 | Liu | H04B 10/0793 |
| | | | | 398/9 |
| 2009/0052321 | A1 * | 2/2009 | Kamath | H04W 40/246 |
| | | | | 370/235 |
| 2009/0180480 | A1 * | 7/2009 | Hilt | H04L 45/00 |
| | | | | 370/395.21 |
| 2012/0102228 | A1 * | 4/2012 | Cugini | H04L 45/50 |
| | | | | 709/242 |
| 2013/0226454 | A1 * | 8/2013 | Hisano | B60W 40/06 |
| | | | | 701/533 |

(Continued)

FOREIGN PATENT DOCUMENTS

KR 20190120057 A * 10/2019 ............. H04L 45/14

*Primary Examiner* — Wutchung Chu (57) ABSTRACT

Methods and systems for load balancing of a communication network are described. Examples of the disclosed methods and systems may be topology agnostic (not specific to a particular network topology). Congestion information is obtained for a plurality of paths between two switches in the communication network. A selection probability is obtained for each path using the congestion information. A flowlet is assigned to a path based on the selection probabilities. Each path may be assigned to a path group, where each path group comprises paths of equal length. The selection probabilities may be computed for each path group and for each path within each path group, and the flowlet may be assigned by selecting a path group based on the selection probabilities of the path groups, and selecting a path within the selected path group.

17 Claims, 4 Drawing Sheets

(56) References Cited

U.S. PATENT DOCUMENTS

| | | | |
|---|---|---|---|
| 2015/0127797 A1* | 5/2015 | Attar | H04L 45/38 |
| | | | 709/223 |
| 2015/0156106 A1* | 6/2015 | Allan | H04L 45/24 |
| | | | 370/238 |
| 2015/0312153 A1* | 10/2015 | Venkataswami | H04L 45/02 |
| | | | 370/235 |
| 2017/0085485 A1* | 3/2017 | Vanini | H04L 47/822 |
| 2018/0034724 A1* | 2/2018 | Fedyk | H04L 45/24 |
| 2018/0077064 A1* | 3/2018 | Wang | H04L 47/115 |
| 2019/0052567 A1* | 2/2019 | Muntz | H04L 69/16 |
| 2019/0327172 A1* | 10/2019 | Shen | H04L 45/127 |
| 2020/0007617 A1* | 1/2020 | Caissy | H04L 67/1023 |
| 2022/0166721 A1* | 5/2022 | Lam | H04L 47/125 |
| 2023/0071278 A1* | 3/2023 | Karri | G06F 9/5055 |

\* cited by examiner

METHODS AND SYSTEMS FOR ADAPTIVE STOCHASTIC-BASED LOAD BALANCING

FIELD

The present disclosure is related to methods and systems for load balancing in a communication network, in particular adaptive load balancing.

BACKGROUND

Load balancing techniques have been developed and used to manage traffic on a communication network, with the aim of avoiding congestion while reducing latency. In general, in a network having multiple paths (each path being one or more links between nodes) connecting multiple nodes, load balancing serves to distribute traffic over the different paths so that latency is reduced and throughput is increased.

Load balancing techniques may be generally categorized into adaptive techniques and static techniques. Adaptive load balancing techniques are responsive to changes in the network state (e.g., if one link becomes congested, traffic is adaptively rerouted to other links), whereas static load balancing techniques are network state invariant (e.g., the shortest paths are randomly used regardless of congestion). In high performance data center networks and networks with heavy traffic, adaptive load balancing techniques typically outperform static load balancing techniques. A challenge with implementation of adaptive load balancing techniques is that they typically introduce greater overhead (e.g., additional resources needed to monitor congestion) and may require specialized hardware (e.g., may not be implementable using off-the-shelf software defined networking (SDN) switches). Solutions that require specialized hardware or modifications to existing hardware may be time-consuming and/or costly to implement. Further, many existing load balancing techniques are designed to operate only in specific network topologies, which limits their practical applications to different networks.

Accordingly, a more practical adaptive solution for load balancing in a communication network is desired.

SUMMARY

In various examples, the present disclosure describes a load balancing technique that may be implemented only in the data plane, without requiring operations performed in the control plane. The ability to provide the load balancing using only data plane operations may provide the technical advantage that the communication network is above to more quickly adapt to changing traffic conditions, thus reducing the risk of congestion and/or dropped packets. Packet drops are generally undesirable because packet drops affect the throughput of the network (e.g., even a very small fraction of packet drop can significantly reduce throughput of the network).

The present disclosure also describes examples that may be implemented using existing hardware (e.g., existing SDN switches). This may enable a more practical and/or less costly solution for load balancing. Examples of the present disclosure may also be topology agnostic (i.e., is not restricted to any specific network topology).

Examples of the present disclosure also may enable smooth transient behavior. Stationary state in the network refers to a network state when traffic in the network is in a steady state. However, when there is a large change in traffic (e.g., a sudden influx of a large volume of traffic from one source) load balancing should be able to smoothly transition from the previous stationary state and quickly converge on a new stationary state that accommodates the change. By enabling smooth transient behavior in the traffic distribution, the risk of packet drop may be reduced.

Network instability may occur if any link becomes overloaded or packets are rerouted at a high frequency, with both scenarios increasing the risk of packet drops. Examples of the present disclosure may help to ensure network stability.

In an example aspect, the present disclosure describes a method for load balancing of a communication network. The method includes: obtaining congestion information for a plurality of paths between two switches in the communication network; obtaining a selection probability for each path in the plurality of paths, wherein the selection probability is determined using the congestion information; and assigning a flowlet to a path in the plurality of paths based on the selection probabilities. In one example, the method may be performed at one switch, alternatively, also may be performed by more than one switches in the network.

In an example of the preceding example aspect of the method, each path in the plurality of paths may assigned to one of one or more path groups, and each path group may include paths of equal length. Determining the selection probability for each path may include computing a selection probability for each path group and computing a conditional probability for selecting each path within each path group. Assigning the flowlet to the path may include selecting the path group based on the selection probabilities of the one or more path groups, and selecting a path within the selected path group based on the conditional probabilities.

In an example of the preceding example aspect of the method, assigning the flowlet to the path may include: selecting the path group based on the selection probabilities of the one or more path groups, wherein the selection probability of a shortest length path group is checked first and the selection probability of a next-shortest length path group is checked only if the shortest length path group is not selected, where the selection probability of each path group may be checked, in order of increasing length path group, until a path group is selected or a longest length path group is selected.

In an example of the preceding example aspect of the method, assigning the flowlet to the path may further include: after selecting the path group, selecting the selected path based on the conditional probabilities of the paths within the selected path group.

In an example of any of the preceding example aspects of the method, the one or more path groups may be ordered in order of increasing path length, and the selection probability for a given path group may be computed based on the selection probability for a next path group in the order of increasing path length.

In an example of the preceding example aspect of the method, each path in the plurality of paths may be assigned to one of one or more path groups, and where each path group may include paths of equal length. Determining the selection probability for each path may include computing a selection probability for each path group. Assigning the flowlet to the path may include selecting a path group based on the selection probabilities of the one or more path groups, and randomly selecting the path within the selected path group.

In an example of any of the preceding example aspects of the method, the selection probability of each path may be determined based on both the congestion information and a path length of each path.

In an example of any of the preceding example aspects of the method, the selection probability for each path may be determined using a stability factor, and the stability factor may cause the determination of the selection probability for a given path to be dependent on a previous determination of the selection probability for the given path.

In an example of any of the preceding example aspects of the method, the congestion information for each given path of the plurality of paths may be obtained as a congestion metric that is determined using a congestion measurement obtained at each switch along the given path, where the congestion metric may represent a congestion level at each given switch when the congestion measurement at the given switch falls between a first lower threshold and a second higher threshold, where the congestion metric may be set to a value representing no congestion when the congestion measurement falls below the first lower threshold, and where the congestion metric may be set to a value representing fully congested when the congestion measurement at the given switch falls above the second higher threshold.

In an example of the preceding example aspect of the method, at least one of the first lower threshold or the second higher threshold may be a variable threshold that may be dependent on a number of flows in the given path.

In an example of any of the preceding example aspects of the method, the determination of the selection probability for each path may be performed using only operations at a switch of the two switches.

In another example aspect, the present disclosure describes a switch in a communication network, including a storage and a processor. The processor is configured to execute instructions stored in the storage to cause the switch to: obtain congestion information for a plurality of paths between the switch and a destination switch; obtain a selection probability for each path in the plurality of paths, wherein the selection probability is determined using the congestion information; and assign a flowlet to a path in the plurality of paths based on the selection probabilities.

In an example of the preceding example aspect of the switch, each path in the plurality of paths may be assigned to one of one or more path groups, and each path group may include paths of equal path length. The selection probability may be determined for each path by computing a selection probability for each path group and compute a conditional probability for selecting each path within each path group. The flowlet may be assigned to the path by selecting a path group based on the selection probabilities of the one or more path groups, and selecting the path within the selected path group based on the conditional probabilities.

In an example of the preceding example aspect of the switch, assigning the flowlet to the path may include: selecting the path group based on the selection probabilities of the one or more path groups, wherein the selection probability of a shortest length path group is checked first and the selection probability of a next-shortest length path group is checked only if the shortest length path group is not selected, where the selection probability of each path group may be checked, in order of increasing length path group, until a path group is selected or a longest length path group is selected.

In an example of the preceding example aspect of the switch, assigning the flowlet to the path may further include: after selecting the path group, selecting the selected path based on the conditional probabilities of the paths within the selected path group.

In an example of any of the preceding example aspects of the switch, the one or more path groups may be ordered in order of increasing path length, and the selection probability for a given path group may be determined based on the selection probability for a next path group in the order of increasing path length.

In an example of the preceding example aspect of the switch, each path in the plurality of paths may be assigned to one of one or more path groups, and each path group may include paths of equal length. Determining the selection probability for each path may include computing a selection probability for each path group. Assigning the flowlet to the path may include selecting a path group based on the selection probabilities of the one or more path groups, and randomly selecting the path within the selected path group.

In an example of any of the preceding example aspects of the switch, the selection probability of each path may be determined based on both the congestion information and a path length of each path.

In an example of any of the preceding example aspects of the switch, the selection probability for each path may be determined using a stability factor, where the stability factor may cause the determination of the selection probability for a given path to be dependent on a previous determination of the selection probability for the given path.

In an example of any of the preceding example aspects of the switch, the congestion information for each given path of the plurality of paths may be obtained as a congestion metric that is determined using a congestion measurement obtained at each switch along the given path, where the congestion metric may represent a congestion level at each given switch when the congestion measurement at the given switch falls between a first lower threshold and a second higher threshold, where the congestion metric may be set to a value representing no congestion when the congestion measurement falls below the first lower threshold, and where the congestion metric may be set to a value representing fully congested when the congestion measurement at the given switch falls above the second higher threshold.

In an example of the preceding example aspect of the switch, at least one of the first lower threshold or the second higher threshold may be a variable threshold that may be dependent on a number of flows in the given path.

In an example of any of the preceding example aspects of the switch, the determination of the selection probability for each path may be performed using only operations at the switch.

In another example aspect, the present disclosure describes a computer readable medium having instructions encoded thereon, wherein the instructions, when executed by a processor of a switch in a communication network, cause the switch to: obtain congestion information for a plurality of paths between the switch and a destination switch; obtain a selection probability for each path in the plurality of paths, wherein the selection probability is determined using the congestion information; and assign a flowlet to a path in the plurality of paths based on the selection probabilities.

In some examples of the preceding example aspect of the computer readable medium, the instructions may cause the switch to perform any of the preceding example aspects of the method.

BRIEF DESCRIPTION OF THE DRAWINGS

Reference will now be made, by way of example, to the accompanying drawings which show example embodiments of the present application, and in which.

Similar reference numerals may have been used in different figures to denote similar components.

DETAILED DESCRIPTION

The present disclosure describes methods and systems for adaptive load balancing in a communication network, which may help to address at least some drawbacks of existing load balancing algorithms. Examples of the present disclosure may be implemented on any network topology (i.e., topology agnostic), may be implemented without requiring any modifications to existing hardware, may be implemented using only data plane operations (i.e., distributed solution that does not require centralized control from the control plane), and may be utilized in a variety of transport layer protocols. Further, examples of the present disclosure may achieve relatively smooth and fast convergence from transient to stationary traffic distribution, may help to maintain stability of the network, and may enable stochastically optimal or near optical stationary traffic distribution.

Figure 1:
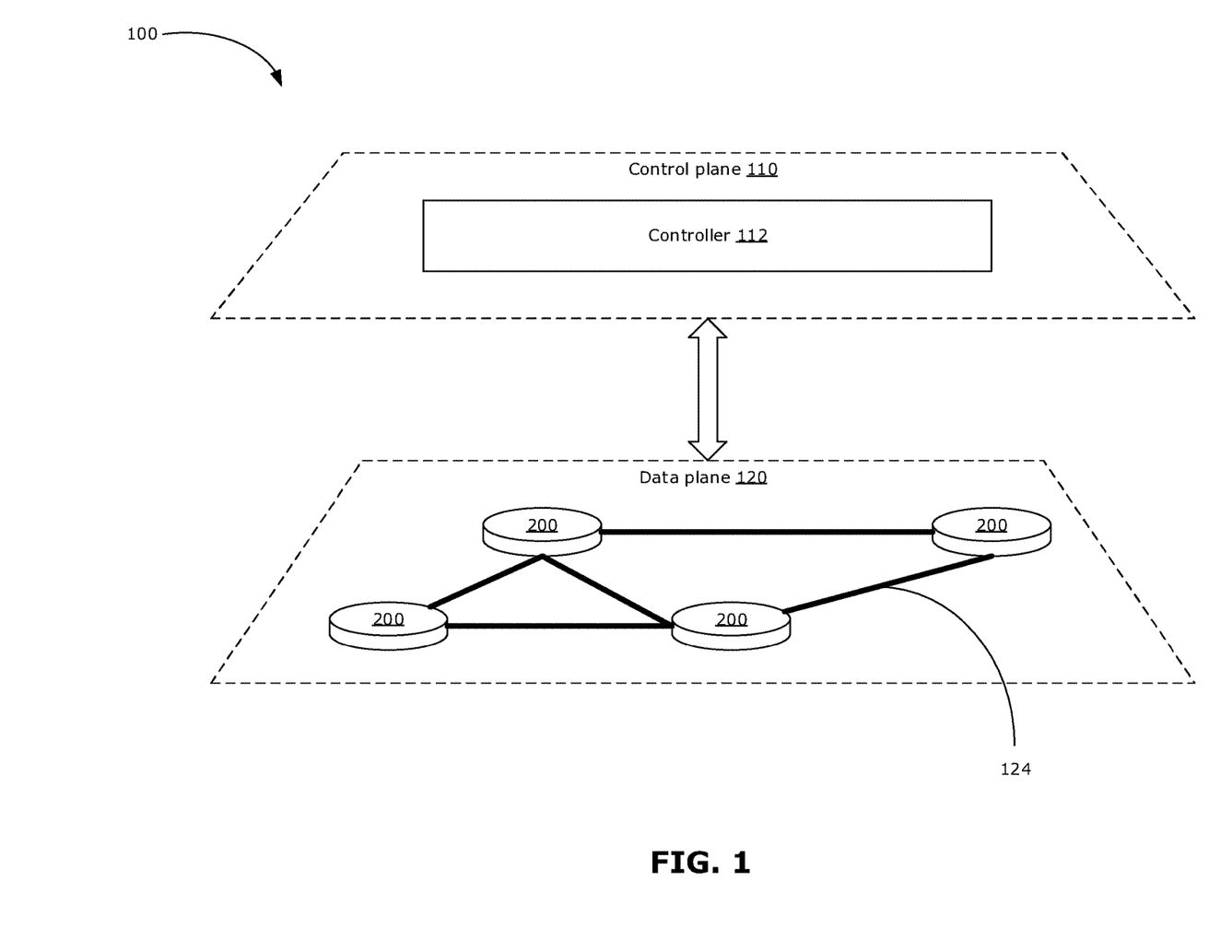
FIG. 1 is a schematic diagram illustrating an example control plane and data plane architecture for a communication network.

FIG. 1 is a schematic diagrams illustrating a simplified example architecture for a communication network 100, in particular a software-defined network (SDN). The example network 100 may be logically divided into the control plane 110 and the data plane 120.

A controller 112 (e.g., a SDN controller) resides in the control plane 110. The controller 112 provides centralized monitoring and control (indicated in FIG. 1 by two-way arrow) of switches 200 and communication links 124 in the data plane 120. Centralized network functions, such as scheduling, analytics, network administration, etc. may be implemented by the controller 112.

Switches 200 reside in the data plane 120. Each switch 200 may also be referred to as a router or a node, for example. Each switch 200 may be an SDN switch, which may be implemented using any suitable existing hardware. The switches 200 may communicate with each other over communication links 124 (e.g., optical fibers, in an optical transport network). FIG. 1 illustrates a simplified network 100 that includes only four switches 200, however it should be understood that the network 100 may be much more complex with many more switches 200 and many more communication links 124. Further, although a certain network topology is illustrated in FIG. 1, it should be understood that the topology of the network 100 (i.e., the connections between switches 200) may be arbitrary.

In general, operations that are carried out by the controller 112 may be referred to as operations in the control plane 110, whereas operations that are carried by the individual switches 200 (i.e., without centralized control by the controller 112) may be referred to as operations in the data plane 120. In order to carry out traffic routing operations using the controller 112, it may be necessary for a switch 200 to communicate (e.g., over a network) with the controller 112, whereas traffic routing operations performed by the switch 200 itself does not require such communication. As may be appreciated, traffic routing operations that are carried out in the control plane 110 may incur greater latency compare to operations that are carried out in the data plane 120 due to the additional time needed to communicate between the switch 200 and the controller 112. Increased latency may be a concern in high performance (e.g., high throughput and/or high speed) networks. Accordingly, load balancing solutions that can be carried out using only operations in the data plane 120 (sometimes referred to as "pure data plane" solutions) may be desirable.

A challenge with implementing load balancing solutions in the data plane 120 is that typical switches 200 (e.g., typical off-the-shelf SDN switches) have limited functionality. For example, a switch 200 typically may have limited ability to perform complex calculations, unlike the controller 112. The present disclosure describes examples that can be implemented using only data plane operations and using existing switches 200 (i.e., without requiring hardware modifications).

Figure 2:
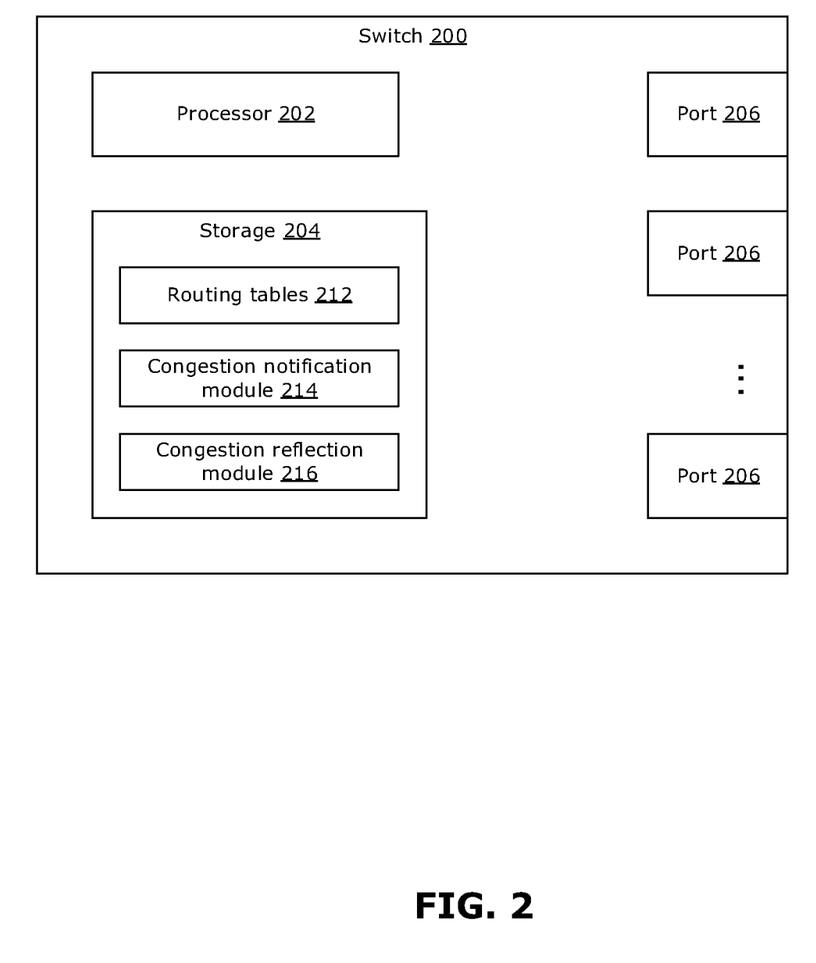
FIG. 2 is a block diagram illustrating an example switch, which may be implemented in the communication network of FIG. 1, in accordance with examples of the present disclosure.

FIG. 2 is a block diagram illustrating some components of an example switch 200. As previously mentioned, the switch 200 may be an existing SDN switch, however the switch 200 has been configured to carry out operations to enable implementation of load balancing operations in the data plane 120, as described further below. For example, the switch 200 may implement modules disclosed herein that configure the switch 200 to perform operations that differ from conventional SDN switches. FIG. 2 illustrates a possible embodiment for the switch 200, and is not intended to be limiting.

As shown in FIG. 2, an example switch 200 includes at least one processor 202. The processor 202 implements various processing operations of the switch 200. The processor 202 may be configured to implement some or all of the functionality and/or embodiments described in more detail herein. The processor 202 includes any suitable processing or computing device, including integrated circuits or chips, configured to perform one or more operations required by the switch 200. The processor 202 could, for example, include a microprocessor, microcontroller, digital signal processor, field programmable gate array, or application specific integrated circuit (ASIC). In particular, the switch may use, as the processor 202, an ASIC with limited instruction set and limited functionalities for performing data plane operations.

The switch 200 includes at least one storage 204. The storage 204 stores instructions and data used, generated, or collected by the switch 200. In particular, the storage 204 may store software instructions and/or modules configured to implement some or all of the functionality and/or embodiments described herein. In the example shown, the storage 204 stores one or more routing tables 212 (which may contain information for routing outgoing traffic), instructions for a congestion notification module 214 and instructions for a congestion reflection module 216 (the operations of which are discussed further below). Instructions and/or modules stored by the storage 204 may be executed by the processor 202. The storage 204 may include any suitable register or volatile and/or non-volatile storage and retrieval device(s). In some examples, the storage 204 may include one or more registers, which may be used to perform fast (but limited) computations. The storage 204 may also include any other suitable type of non-transitory memory, such as random access memory (RAM), read only memory (ROM), hard disk, optical disc, and the like.

The switch 200 includes a plurality of ports 206 for receiving incoming traffic and for sending outgoing traffic. A port 206 that is used to receive incoming traffic may be referred to as an ingress port, and a port 206 that is used to send outgoing traffic may be referred to as an egress port. A communication link 124 between two switches 200 may comprise a connection (e.g., an optical fiber) between a given port 206 in one switch 200 and a given port 206 in another switch 200. The port 206 by which data (e.g., a packet or a flowlet) exits a switch 200 may determine the next switch 200 that the data arrives at. Each egress switch 200 may be associated with a respective queue. In order to direct data to exit at a given port 206, the switch 200 may place the data in a queue associated with the given port 206. In this way, the length of a queue (i.e., the amount of data placed in the queue) associated with a given port 206 may be used as a metric to indicate the congestion on the communication link 124 associated with the given port 206. Other techniques may be used to indicate congestion on the communication link 124 associated with the given port 206, such as port utilization rate.

Data that is communicated over the communication links 124 of the network 100 may be referred to as network traffic. Traffic that is communicated from a source switch 200 to a destination switch 200 may traverse one or more communication links 124 and possibly one or more intermediate switches 200 (where an intermediate switch is a switch 200 traversed by the traffic that is neither the source switch 200 nor the destination switch 200). The communication link(s) 124 traversed by the traffic from the source switch 200 to the destination switch 200 may be referred to as a path. A goal of load balancing is to manage traffic distribution over the communication links 124 so as to avoid or reduce congestion, while aiming to reduce the length of the path traversed by the traffic (where a shorter path is expected to result in faster communication).

An aspect of load balancing is the granularity of traffic that is considered. For example, traffic distribution may be managed at the packet level (sometimes referred to as packet-based load balancing) in which a path is determined for every individual packet. In another example, traffic distribution may be managed at the flowlet level (sometimes referred to as flowlet-based load balancing) in which a path is determined for a group of packets (a group of a variable number of packets being referred to as a flowlet). In another example, traffic distribution may be managed at the flowcell level (sometimes referred to as flowcell-based load balancing) in which a path is determined for a group of a fixed number of packets (a group of a fixed number of packets being referred to as a flowcell). In another example, traffic distribution may be managed at the flow level (sometimes referred to as flow-based load balancing) in which a path is determined for all traffic (i.e., the entire flow of traffic). For simplicity, the following discuss will describe examples where traffic is managed on the flowlet level, however it should be understood that the present disclosure is not limited to flowlet-based load balancing and may be applicable to load balancing using a different granularity of traffic.

The congestion notification module 214 may be executed to perform operations for monitoring and computing traffic distribution, and the congestion reflection module 216 may be executed to perform operations for load balancing of the traffic (e.g., flowlets) based on the computed traffic distribution. Although the present disclosure describes the congestion notification module 214 and the congestion reflection module 216 as separate software modules, it should be understood that in some embodiments the congestion notification module 214 and the congestion reflection module 216 may be implemented as a single module or different modules in different switches. Further, operations describes as being performed using the congestion notification module 214 may instead be performed using the congestion reflection module 216, and vice versa.

Figure 3:
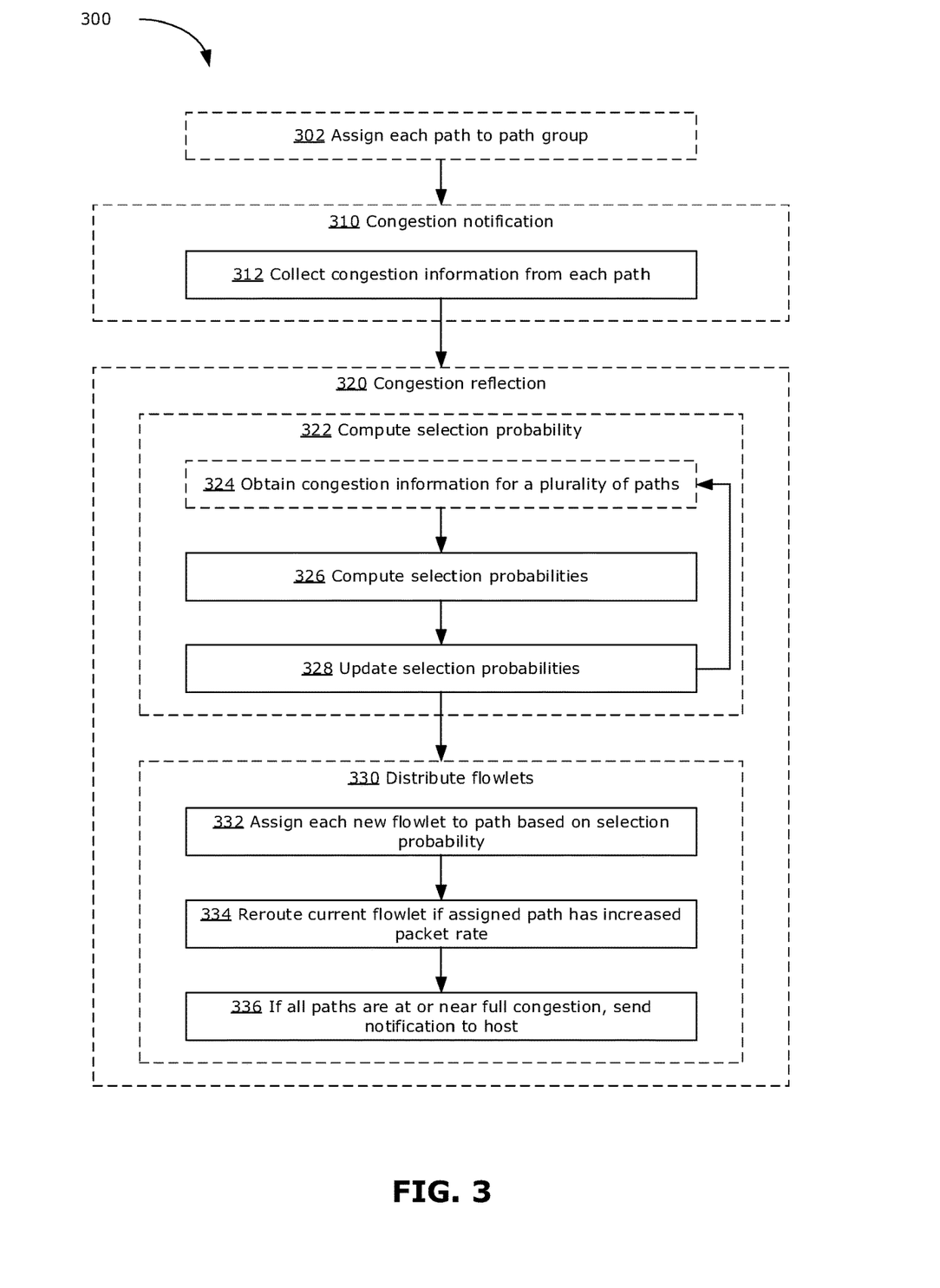
FIG. 3 is a flowchart illustrating an example method for load balancing, which may be performed by the switch of FIG. 2, in accordance with examples of the present disclosure.

FIG. 3 is a flowchart illustrating an example method 300 for load balancing, which may be performed by a given switch 200 (which may be in the role of a source switch). For example, the processor 202 of the given switch 200 may execute instructions stored in the storage 204 to implement the congestion notification module 214 and the congestion reflection module 216, in order to perform steps of the method 300.

The method 300 is illustrated as having a congestion notification operation 310 and a congestion reflection operation 320. The congestion notification operation 310 may be carried out using operations performed by the congestion notification module 214 and the congestion reflection operation 320 may be carried out using operations performed by the congestion reflection module 216, however it should be understood that this is not intended to be limiting. Further, although the congestion notification operation 310 and the congestion reflection operation 320 are illustrated as separate operations, this is not intended to be limiting. For example, the congestion notification operation 310 and the congestion reflection operation 320 may be performed by a single software module of the given switch 200, such that there is no logical division between the congestion notification operation 310 and the congestion reflection operation 320.

Regardless of implementation, the congestion notification operation 310 may be performed continuously and repeatedly in order to monitor congestion. The congestion reflection operation 320 may also be performed continuously and repeatedly to respond to changes in congestion.

Optionally, at 302, the given switch 200 may assign each path to a respective path group. Path discovery may be performed through control plane or data plane. For example, the given switch 200 may (e.g., when first initialized, at regular intervals, etc.) perform operations to discover the paths in its local topology (i.e., all paths that originate from the given switch 200), for example using any suitable topology discovery techniques. For each possible destination switch, all paths from the given switch 200 to a given destination switch are grouped by length (e.g., by number of links in the path), such that all paths from the given switch 200 to the same given destination switch having the same length are assigned to the same path group (which may be referred to as an equal length group).

Step 302 may be performed in advance (e.g., when the given switch 200 is first added to the network), and may not be part of the method 300.

Regardless of whether step 302 is performed as part of the method 300 or in advance, the result is that the given switch 200 has stored in memory or storage one or more path groups associated with each possible destination switch from the given switch 200, where paths of equal length (where the paths are from the given switch 200 to the same given destination switch) are assigned to the same path group.

At 312, congestion information is collected for each path. In particular, congestion information is collected for all paths that may originate from the given switch 200 (i.e., the given switch 200 that is performing the method 300 is the source switch). Various techniques may be used to collection congestion information.

For example, congestion information may be collected using a mechanism by which congestion information is collected as a packet traverses a path from the given switch 200 to a destination switch, and the collected information is sent from the destination switch back to the given switch 200 (e.g., using the approach that has been described in above-cited references for use in CONGA and W-ECMP). For example, in a packet that is to be sent along a path from the given switch 200 to a destination switch, a portion of the packet header may be used to store information regarding congestion at each switch that is traversed along the path. The congestion information that is collected for a path may reflect the congestion at the most congested link within the path. For example, at every switch that is traversed by the packet, including every intermediate switch along the path as well as the destination switch, the packet header may be updated with a congestion metric indicating congestion for a traversed link at that switch if the congestion metric at that switch is higher (i.e., the switch is more congested) than the congestion metric that is already stored in the packet header. Optionally, if the congestion metric is updated, the switch identifier may also be inserted into the packet header. In another approach, instead of updating the stored congestion metric when a switch has a higher congestion metric, the congestion metric at every traversed switch may be inserted into the packet header (regardless of whether the congestion metric is higher or lower than another congestion metric stored in the header), but only the highest congestion metric may be sent back to the given switch 200. Regardless of the specific mechanism for collecting the congestion information, when the packet reaches the destination switch, the collected congestion information (e.g., the congestion metric in the packet header representing the most congested link) may then be sent back to the given switch 200. The given switch 200 thus receives information about the congestion experienced by the packet along the path (which may be represented by the highest congestion metric along the path). In this way, the given switch 200, after sending a plurality of packets over a plurality of paths to one or more destination switches, collects congestion information about a plurality of paths that originate from the given switch 200 (i.e., a plurality of paths where the given switch 200 is the source switch).

An example congestion metric, as disclosed herein, that may be used for collecting congestion information is:

$$cl(t) = \begin{cases} 0 & r(t) < th_1(t) \\ \frac{r(t) - th_1(t)}{th_2 - th_1(t)} & th_1 \leq r(t) < th_2 \\ 1 & r(t) \geq th_2 \end{cases}$$

where $cl(t)$ denotes the congestion metric for a path at time t ($cl(t) \in [0,1]$), $r(t)$ denotes the normalized rate of link utilization ($r(t) \in [0,1]$) and $th_1(t)$ and $th_2$ denote first and second thresholds (and where the first threshold is lower than the second threshold). The congestion metric may be computed for each link along the path, and the highest congestion metric computed at a link may be used as the congestion metric for the path. It should be understood that the normalized rate of link utilization $r(t)$ may be replaced with any other suitable congestion measurement, such as queue length. Further, it should be noted that the congestion metric represents the actual congestion level (normalized by the difference between the second and first thresholds), only for link utilization that falls between the first and second thresholds. If link utilization that falls outside the first and second thresholds (i.e., is below the first threshold or is above the second threshold), the congestion metric may be set to a fixed value. For example, when the link utilization falls below the first threshold, the congestion metric may be set to a value that represents no congestion, for example a value of zero; and when the link utilization falls above the second threshold, the congestion metric may be set to a value that represents fully congested, for example a value of one.

The first threshold (i.e., $th_1(t)$) may be referred to as a congestion sensitivity threshold. Any link utilization that falls below the first threshold may be ignored or considered equivalent to zero congestion (i.e., $cl(t)=0$). That is, the congestion metric may be defined such that any link utilization below the first threshold is considered to be negligible. By using the first threshold, the congestion metric may only need to be computed when link utilization rises to a level that could affect the traffic, thus reducing the need to perform computations (and reducing the computational burden on the switch 200). The first threshold may be a variable threshold. Although the above equation denotes the first threshold to be a function of time, the first threshold may instead be a function of the number of flows being handled by the link. For example, the first threshold may be defined as a function that decreases with increasing number of flows in the link. This may allow the congestion metric to be more sensitive to the possibility of congestion, since there is a higher possibility of congestion when there is a larger number of flows in the link. In other examples, the first threshold may be a constant threshold (e.g., fixed at a low rate of link utilization, such as 20%).

The second threshold (i.e., $th_2$) may be referred to as a congestion cap threshold. Any link utilization that is above the second threshold may be considered equivalent to complete congestion (i.e., $cl(t)=1$). That is, the congestion metric may be defined such that a link that has utilization above the second threshold is considered to be fully congested. This may prevent traffic from being routed to the link when the link is at a high utilization (even if there is still some capacity still available on the link), thus avoiding complete congestion. By using the second threshold, the congestion metric may provide a conservative indication of congestion (e.g., a link is indicated as being fully congested even if link utilization is below 100%, as long as link utilization is above the second threshold). Further, using the second threshold means that the congestion metric may not need to be computed when link utilization is above the second threshold, thus reducing the need to perform computations (and reducing the computational burden on the switch 200). Although the above equation indicates the second threshold is a constant threshold (e.g., fixed as a high rate of link utilization, such as 90%), in some examples the second threshold may be variable (e.g., may be a function of the number of flows in the link). For example, if there is a larger number of flows in the link, the second threshold may be decreased.

The use of first and/or second thresholds in the disclosed congestion metric may help to improve network stability by decreasing the amount of flowlet rerouting and path changing that may be performed. By using first and/or second thresholds that are functions of the number of flows in the link, the disclosed congestion metric may be more adaptive to flows in the network (e.g., management of network traffic may be more sensitive to changes in traffic when there is a large number of flows).

As indicated in the above equation, the disclosed congestion metric is a normalized value (i.e., $cl(t) \in [0,1]$). This may enable the subsequent congestion reflection operation 320 to be agnostic about how the congestion metric is defined, and may enable a more modular design that decouples the congestion notification module 214 and the congestion reflection module 216, in some implementations.

Other congestion metrics may be additionally or alternatively used. For example, other suitable congestion metrics may be based on other congestion indicators (e.g., the queue length at the egress port), may or may not use the first and/or second thresholds, may or may not be normalized, etc.

The congestion information collected by the congestion notification module 214 may be provided to the congestion reflection module 216 to perform the congestion reflection operation 320 (e.g., if the congestion notification module 214 and the congestion reflection module 216 are separate software modules of the switch 200).

The congestion reflection operation 320 may be logically divided into a compute selection probability operation 322 and a distribute flowlets operation 330. For example, the congestion reflection module 216 may include a selection probability computation submodule and a flowlet distribution submodule (not shown in FIG. 2) to perform the respective operations. It should be understood that the selection probabilities may not necessarily be computed by the congestion reflection module 216 of the given switch 200 and may be obtained in another manner (e.g., obtained from another module or another switch where the computations are performed).

Optionally, at 324, the congestion information may be obtained for a plurality of paths, for example by the congestion reflection module 216 receiving collected congestion information from the congestion notification module 214. In some examples, such as examples where a single module is implemented instead of separate congestion notification module 214 and congestion reflection module 216, the congestion information collected at step 312 may be directly used without being obtained from another module, and step 324 may be omitted.

At 326, a selection probability is obtained for each path. The selection probability may be determined for each path based on the congestion information. For example, the given switch 200 may perform operations (e.g., using congestion reflection module 216) to compute the selection probabilities. In some examples, the selection probability may be computed for each path group and for each path within each path group. In this computation, the selection probability represents the probability that a given path (or path group) is selected for routing a flowlet and is inversely related (but not necessarily mathematically inversely proportional) to the congestion level in the path (i.e., a more congested path will have a lower selection probability). The selection probability may also be based on the path length of the path (or path group). Generally, a path (or path group) that has a higher selection probability is more likely to be selected for routing a flowlet. As will be discussed further below, flowlet distribution, in some examples, may be based on both the selection probability for a path group and the selection probability for a path within a path group. In some examples, flowlet distribution may be based on the selection probability for each path, without having to compute selection probability for each path group. An example in which selection probability is computed for each path group as well as each path within each path group is first discussed. An example of selection probability computation, which does not include computing selection probability for each path group, is provided further below.

Each path group (or equal length group) from the given switch 200 to a given destination switch may be denoted as $EL_j^{\{m,n\}}$, where the path groups may be indexed by an index j, starting with j=0 for the shortest path group (although it should be noted that j does not necessarily equal the number of links or length of path in a path group), m denotes the index of the source switch (i.e., the given switch 200) and n denotes the index of the destination switch. For simplicity, the following discussion describes the computation of selection probabilities for paths between the given switch 200 and a single destination switch (and the superscript {m,n} may be omitted), however it should be understood that similar computations may be performed to compute selection probabilities for paths between the given switch 200 and all possible destination switches.

The selection probability for the j-th path group (i.e., the path group having index j) may be computed using the following equation:

$$P(EL_j) = 1 - \frac{\sum_i cl_i}{m_j} + (1 - P(EL_{j+1}))$$

where $P(EL_j)$ denotes the selection probability for j-th path group, $m_j = |EL_j|$ (i.e., is the number of paths assigned to the path group), and $cl_i$ denotes the congestion metric of the i-th path assigned to the path group.

It may be noted that for above computation of the selection probability for a path group the selection probability for the j-th path group is based on not only the congestion metric of the paths within the j-th path group, but is also based on the selection probability of the (j+1)-th path group (i.e., the path group that has the next higher path length, since the path groups are indexed in order of increasing path length). If there is no (j+1)-th path group (i.e., the j-th path group is the path group with the longest path length), then the $(1-P(EL_{j+1}))$ may be omitted. Since the selection probability of the j-th path group is based on the congestion in the (j+1)-th path group, the above computation results in a higher selection probability for the j-th path group if the next indexed path group is at a high congestion level. Thus, the above definition of the selection probability for the j-th path group increases the likelihood of selecting a path group that is less congested and also that has a shorter path length.

For example, consider the simplified case where there are two path groups, denoted $EL_0$ and $EL_1$, where there are three paths in path group $EL_0$ and two paths in path group $EL_1$. Notably, it is not necessary to know the path length of each path group since they are already indexed in order of increasing path length, such that the path length of path group $EL_0$ is shorter than the path length of path group $EL_1$. If the congestion metric in all paths are equal, for example $cl_i=0.5$ for all paths, then the selection probabilities for the two path groups may be computed as follows:

$$P(EL_1) = 1 - \frac{0.5 + 0.5}{2} = 0.5$$

$$P(EL_0) = 1 - \frac{0.5 + 0.5 + 0.5}{3} + 0.5 = 1$$

Thus, it can be seen that the selection probability results in the shorter path length group being more likely to be selected for routing a flowlet, given equal congestion levels.

It should be understood that other computations of the selection probability for each path group may be used. For example, an alternate computation of the selection probability for the j-th path group may be based on only the congestion metric of the paths belonging to the j-th path group and may omit the selection probability of the (j+1)-th path group.

Additionally, the selection probability of each path within a given path group is computed. The selection probability of each path within a given path group is a conditional probability, denoted $P(pth_i|EL_j)$ for the i-th path in the j-th path group. The selection probability for the i-th path in the j-th path group may be computed based on a function f defined as follows:

$$f(pth_i | EL_j) = \begin{cases} 1 - cl_i & pth_i \in EL_j \\ 0 & pth_i \notin EL_j \end{cases}$$

where $cl_i$ denotes the congestion metric for the i-th path.

In some examples, the function f defined above may be directly used as the selection probability for the i-th path in the j-th path group (i.e., $P(pth_i|EL_j)=f(pth_i|EL_j)$). In other examples, to improve network stability (e.g., by reducing the frequency of path changes), the selection probability for the i-th path in the j-th path group may be computed as follows:

$$P_{(k+1)}(pth_i|EL_j)=\gamma P_{(k)}(pth_i|EL_j)+(1-\gamma)f(pth_i|EL_j)$$

where $\gamma$ is a predefined constant with a value $0 \leq \gamma < 1$, and k+1 represents the timestep for selection of a path for the next incoming flowlet. The value of $\gamma$ may be manually defined (e.g., by an administrator of the network 100), or set by default (e.g., by a manufacturer of the given switch 200). Defining a smaller value for $\gamma$ results in the selection probability being more affected by the function f (with the special case of $\gamma=0$ resulting in $P(pth_i|EL_j)=f(pth_i|EL_j)$), such that the selection probability (and thus flowlet distribution) is more sensitive and reactive to changes in congestion level in the paths. Thus, a smaller value of $\gamma$ results in flowlet distribution that is more responsive to current congestion levels, with the tradeoff that stability of the network 100 may worsen. A default value of $\gamma=0.5$ may be generally suitable for implementation.

As shown in FIG. 3, the steps 324 and 326 may be performed repeatedly to continuously update the selection probabilities of each path (and path groups), as congestion information is obtained. The given switch 200 may maintain a table or other record of the selection probabilities, for example stored in a memory or storage of the given switch 200. After each computation of the selection probabilities, the stored probabilities may be updated.

The selection probabilities as defined above may be implemented using the limited functionality of existing switch hardware, thus enabling implementation in the data plane 120 (i.e., without requiring operations by the controller 112). Further, by computing selection probabilities (instead of more single selection values) may enable the load balancing of traffic to be carried out using only operations in the data plane 120. This will be discussed further below.

The distribute flowlets operation 330 is carried out to distribute flowlets (intended for a given destination switch) over the possible paths between the given switch 200 and the given destination switch. In particular, the distribute flowlets operation 330 makes use of the selection probabilities computed in the compute selection probability operation 320.

At 332, any new flowlet at the given switch 200 is assigned to one of the possible paths based on the computed selection probabilities. To account for the limited functionality of typical switch hardware (and thus to enable implementation in the data plane 120), this step is performed without having to implement any for loop.

Figure 4:
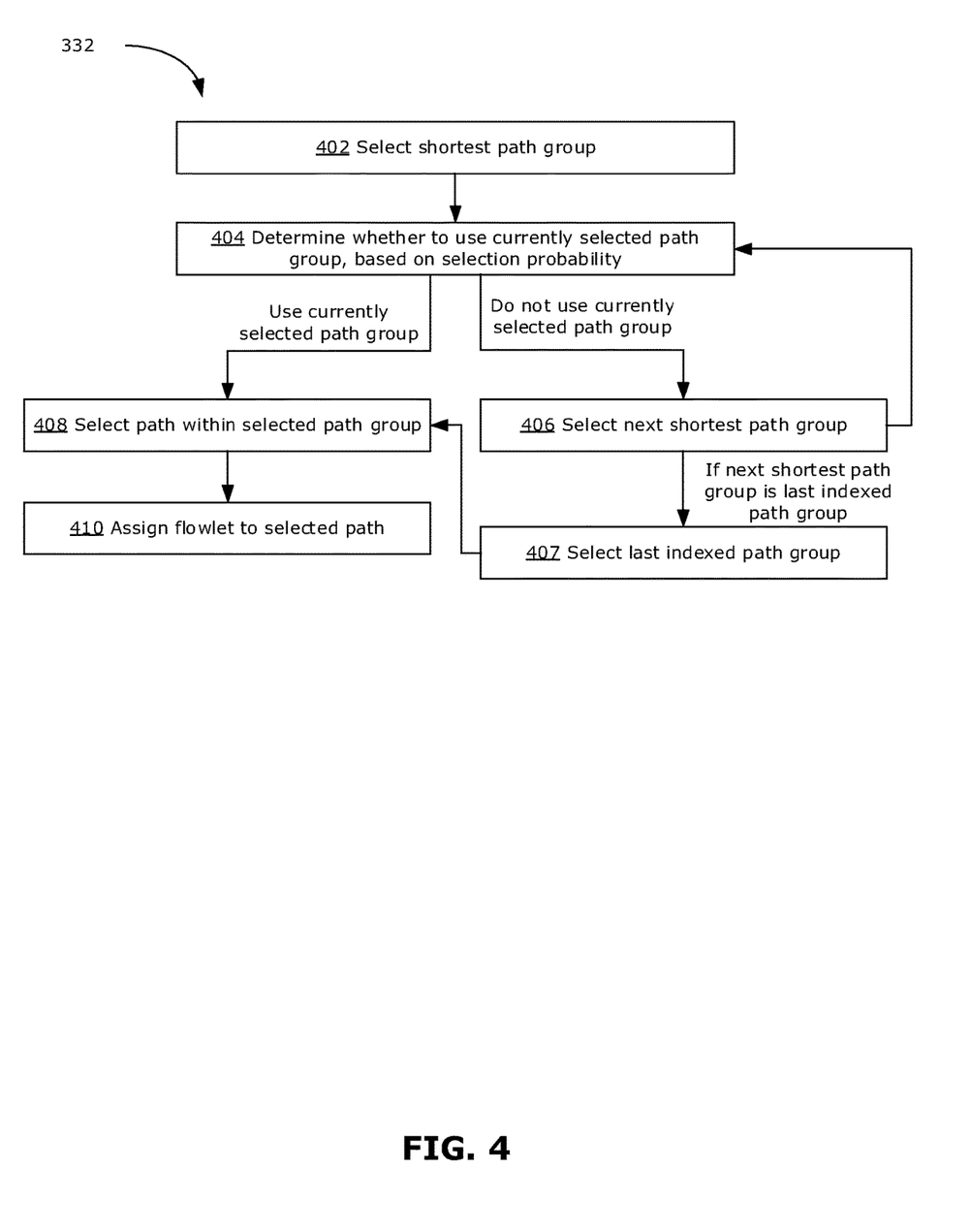
FIG. 4 is a flowchart illustrating an example method for assigning a flowlet to a selected path, in accordance with examples of the present disclosure.

FIG. 4 is a flowchart illustrating example details for performing step 332, where selection probabilities are computed for each path group and for each path within each path group. In particular, FIG. 4 is concerned with assigning a path for a new flowlet, given an intended destination switch for the flowlet. The possible paths from the given switch 200 to the given destination switch are known and the possible paths have been assigned to equal length path groups in advance (e.g., at step 302 or in advance of the method 300). Thus, there are one or more path groups that are associated with the given destination switch, where each path group includes one or more paths (that can be traversed by the flowlet from the given switch 200 to the given destination switch), and where all paths within the same path group are of equal length. The length of the equal length paths belonging to the path group may be referred to simply as the path length of the path group. Further, the one or more path groups are indexed (or ranked) in order of path length. For example, the path group having the shortest path length may be indexed at 0 (or any other suitable indexing or ranking in order of path length).

At 402, the shortest path group is selected. For example, the path group with index 0 (denoted $EL_0$) is selected. It should be noted that the index of the path group is not necessarily equal to the path length of the path group.

At 404, a determination is made whether to use the currently selected path group, based on the selection probability (computed at 326) of the currently selected path group. This determination may be a probabilistic determination. For example, instead of comparing the selection probability of the currently selected path group against a fixed threshold, a random number may be sampled or generated within the range (0,1) (e.g., from a uniform distribution, a Gaussian distribution centered on 0.5, etc.). If the selection probability of the currently selected path group is not equal to or greater than the random number, the currently selected path group is not used and the method proceeds to step 406.

At 406, the next shortest path group is selected. For example, the path group index may be increased by one (such an operation is within the functionality of typical switch hardware and avoids the use of a for loop). The method then returns to step 404 to determine whether this newly selected path group should be used. If the next shortest path group is the last indexed path group (i.e., the path group having the longest path length), then, at 407, the last indexed path group (i.e., the longest length path group) is selected and the method proceeds to step 408.

Returning to step 404, if the selection probability of the currently selected path group is equal to or greater than the random number, the currently selected path group is used and the method proceeds to step 408.

At 408, a path within the selected path group is selected. This may be a probabilistic selection. For example, a path within the selected path group may be selected randomly. In another example, a path may be selected based on the selection probability of each path within the selected path group. For example, instead of comparing the selection probability of each path in the selected path group against a fixed threshold, another random number may be sampled or generated within a fixed range (e.g., range [0,1]) (e.g., from a uniform distribution, a Gaussian distribution centered on 0.5, etc.). The fixed range may be divided into intervals corresponding to the selection probability of each path in the currently selected path group. For example, the selection probability of each path may be normalized by the sum of the selection probabilities of all paths in the selected path group, and the fixed range may be divided into intervals corresponding to the size of the normalized probabilities. Then, based on which interval the random number falls within, the corresponding path may be selected. For example, if the selected path group contains three paths (denoted pth1, pth2, pth3) having selection probabilities 0.7, 0.8 and 0.5, respectively, then the normalized probabilities (normalized by the sum of the selection probabilities, which is 2) for pth1, pth2 and pth3 are 0.35, 0.4 and 0.25, respectively. The range [0,1] may then be divided into three intervals as follows: a first interval [0, 0.35] corresponding to pth1 (the first interval has an interval size 0.35, which is the size of the normalized probability for pth1), a second interval (0.35, 0.75] corresponding to pth2 (the second interval has an interval size 0.4, which is the size of the normalized probability for pth2), and a third interval (0.75, 1] corresponding to pth3 (the second interval has an interval size 0.25, which is the size of the normalized probability for pth3). If the random number (sampled from the range [0,1]) falls within the first interval, then pth1 is selected; if the random number falls within the second interval, then pth2 is selected; and if the random number falls within the third interval, then pth3 is selected. It should be understood that this is only exemplary, and other methods for selecting a path within a selected path group, based on the selection probabilities of each path within the selected path group, may be used.

At 410, the new flowlet is assigned to the selected path. The selected path for the flowlet may be stored in the routing table in the memory or storage of the given switch 200.

Reference is again made to FIG. 3. The distribute flowlets operation 330 also includes, at step 334, rerouting any current flowlet (which already has an assigned path) if the flowlet has increased its packet rate. An increase in the packet rate of the flowlet may mean that the path that has been assigned to the flowlet may become congested. An increase in the packet rate of a current flowlet may be detected based on the congestion information collected from the assigned path (e.g., if the collected congestion information indicates that the congestion of the assigned path has increased beyond a certain level). A current flowlet may be rerouted by, for example splitting the flowlet into a new flowlet and assigning a path to the new flowlet based on selection probabilities, similar to step 332 described above.

At 336, if all paths are at or near full congestion, a notification may be explicitly or implicitly generated to the host (i.e., the system that is attempting to send data to the given destination switch). For example, an indication that all paths to the given destination switch are at or close to fully congested is that the selection probability for all path groups associated with the given destination switch have a selection probability of zero, or a selection probability below a certain value (e.g., below 0.2). An explicit notification may, for example, be a message that paths are congested. A new flowlet to the given destination switch may still be assigned to a path (despite the path being congested), with a high likelihood that packets will be dropped at a congested switch along the path. An early packet drop may be an implicit notification that all paths are at or near full congestion.

Although steps 332-336 are shown in a particular order, it should be understood that steps 332-336 may be performed in any order and may be performed in parallel. Further, steps 332-336 may be performed continuously, in response to continuous updates to the congestion information and changes in the flowlets arriving at the given switch 200.

Using the path selection method described above, in which selection probabilities are computed for path groups and for paths within each path group, the result is that load balancing of the traffic is based on not only the congestion level of individual paths, but based on the congestion level of equal length path groups. This means that shorter paths will be selected more preferentially, assuming equal congestion levels in all paths. Only after a path group has been selected is the congestion level of individual paths within the path group considered.

Further, the path selection is a probabilistic selection, rather than based on a hard threshold. This avoids the problem that a single preferred path is likely to become overloaded.

Although an example definition of the selection probability, which is computed for each path group and for each path within a path group, has been described above, the present disclosure is not limited to this example. For example, another possible definition of the selection probability, as described below, may be used, which does not require computing selection probabilities for the path groups. The following definition of the selection probability requires computations requiring a for loop. In some cases, implementation of a for loop may not be within the functionality of existing SDN switches, which means that any selection probability that requires a for loop in its computation may not be implementable using only operations in the data plane. However, future SDN switches may be capable of such functionality and may enable computation of such a selection probability using only operations in the data plane.

In some examples, the selection probability may be defined using a ratio-like function, denoted PR(x,y). This ratio-like function is defined as follows:

$$PR(x, y) = \frac{q(x)}{q(y)}$$

where $x, y \in \mathbb{N}$, and $q \in \mathbb{R}[X]$ (i.e., a polynomial in the single indeterminate X with positive real coefficients).

In the case where q=X, this means $$PR(x, y) = \frac{x}{y},$$

which is the same as a ratio function. For computation of the selection probability, $q = X^\kappa$, where $\kappa \in \mathbb{Z}^{\geq 0}$ and $\kappa$ is a selectable value. Selecting a larger value for $\kappa$ results in the selection probability placing higher emphasize on the path length (i.e., if $x<y$ and $k_0>k_1$ then $$\text{(i.e., if } x < y \text{ and } k_0 > k_1 \text{ then } \left(\frac{x}{y}\right)^{k_0} > \left(\frac{x}{y}\right)^{k_1}\text{)}.$$

).

A congestion feedback function, denoted $s_i$, may be defined as follows:

$$s_i = \sum_{k \neq i}^{n} \omega_k(cl) PR(\ell_i, \ell_k)$$

where $l_i$ denotes the length of the i-th path (i.e., $pth_i$) and $\omega_k(\cdot)$ denotes a monotonically decreasing function such that if $cl_k = 1$, $\omega_k(cl) \equiv 0$. A simplified example for $\omega_k(\cdot)$ may be, for example, $\omega_k(cl) = (1 - cl_k)$.

If $pth_i \in EL_0$ (i.e., the i-th path belongs in the shortest length path group), then a function $F_i(cl)$ is defined as follows:

$$F_i(cl) = \frac{1 - \sum_{k \neq i}^{n} \frac{\omega_k(cl) PR(\ell_i, \ell_k)}{s_i} cl_i + \sum_{k \neq i}^{n_0} \frac{\omega_k(cl) PR(\ell_i, \ell_k)}{s_k} cl_k}{m_0}$$

Conceptually, the function $F_i(cl)$ means that, for a given path belonging to the shortest length path group, the probability for selecting the given path is decreased when the congestion at the given path is high and is increased when the congestion at other paths is high.

If $pth_i \notin EL_0$ (i.e., the i-th path does not belong in the shortest length path group), then a function $G_i(cl)$ is defined as follows:

$$G_i(cl) = \frac{\omega_k(cl) \sum_{k=0}^{n_0} \frac{PR(\ell_i, \ell_k)}{s_k} cl_k}{m_0}$$

Note that if the congestion at all paths is zero, then the function $F_i(cl)$ is one and $G_i(cl)$ is zero (i.e., favors selection of the shortest path). Using the above definitions of $F_i(cl)$ and $G_i(cl)$, the selection probability for the i-th path may be computed as follows:

$$\dot{p}_i = -a p_i + a F_i(cl) \text{ for } pth_i \in EL_0$$

$$\dot{p}_i = -a p_i + a G_i(cl) \text{ for } pth_i \notin EL_0$$

where $a > 0$ is a stability factor (where a larger value for a enables faster reaction to changes in congestion, but less smoothness in transient behavior), $p_i$ denotes the selection probability for the i-th path (denoted $pth_i$), and $\dot{p}_i$ denotes the time derivative of $p_i$. The use of the time derivative together with the stability factor in the above computations helps to ensure stability of the network.

In the above definition, the selection probability of each path is computed individually (rather than being computed based on the selection probability of the path group). This selection probability may be more generic, may be a more precise way to select a path (e.g., ensuring a flowlet is assigned to the least congested and/or shortest path) and may not require computation of the selection probability of each path group.

Examples of the disclosed methods and systems may be used for load balancing in any network topology (e.g., does not assume a Clos network). The present disclosure enables path selection to be based on not only the level of congestion in each path, but also the path lengths.

Examples described above make use of a piggybacking mechanism to collect congestion information, where congestion information is inserted into a packet header. However, it should be understood that other methods for collecting congestion information may be used.

The present disclosure describes an example congestion metric, which makes use of two thresholds, referred to as a first threshold (or congestion sensitivity threshold) and a second threshold (or congestion cap threshold). Any congestion level below the first threshold may be considered negligible (e.g., congestion metric is zero). This may result in greater network stability because path changing is reduced. The first and/or second thresholds may also be variable, for example being adaptive to the number of flows. The congestion metric may also be independent of the congestion measurement used (e.g., queue length, link utilization rate, etc.), such that the method for load balancing is not affected if the congestion measurement is changed.

Examples of the present disclosure may be implemented using only operations in the data plane (depending on how the selection probability is defined), using existing hardware capabilities of typical SDN switches. This may enable the load balancing to be performed faster, in order to be more responsive to changing traffic, particularly in a high performance and/or high throughput network.

Although the present disclosure describes methods and processes with steps in a certain order, one or more steps of the methods and processes may be omitted or altered as appropriate. One or more steps may take place in an order other than that in which they are described, as appropriate.

Although the present disclosure is described, at least in part, in terms of methods, a person of ordinary skill in the art will understand that the present disclosure is also directed to the various components for performing at least some of the aspects and features of the described methods, be it by way of hardware components, software or any combination of the two. Accordingly, the technical solution of the present disclosure may be embodied in the form of a software product. A suitable software product may be stored in a pre-recorded storage device or other similar non-volatile or non-transitory computer readable medium, including DVDs, CD-ROMs, USB flash disk, a removable hard disk, or other storage media, for example. The software product includes instructions tangibly stored thereon that enable a processor device (e.g., a personal computer, a server, or a network device) to execute examples of the methods disclosed herein.

The present disclosure may be embodied in other specific forms without departing from the subject matter of the claims. The described example embodiments are to be considered in all respects as being only illustrative and not restrictive. Selected features from one or more of the above-described embodiments may be combined to create alternative embodiments not explicitly described, features suitable for such combinations being understood within the scope of this disclosure.

All values and sub-ranges within disclosed ranges are also disclosed. Also, although the systems, devices and processes disclosed and shown herein may comprise a specific number of elements/components, the systems, devices and assemblies could be modified to include additional or fewer of such elements/components. For example, although any of the elements/components disclosed may be referenced as being singular, the embodiments disclosed herein could be modified to include a plurality of such elements/components. The subject matter described herein intends to cover and embrace all suitable changes in technology.

The invention claimed is:

1. A method for load balancing of a communication network, the method comprising:
    obtaining congestion information for a plurality of paths between two switches in the communication network, wherein each path in the plurality of paths is assigned to one of one or more path groups, and wherein each path group comprises paths of equal length;

obtaining a selection probability for each path in the plurality of paths, wherein the selection probability is determined using the congestion information, wherein the selection probability is further determined for each path by computing a selection probability for each path group and computing a conditional probability for selecting each path within each path group; and assigning a flowlet to a selected path in the plurality of paths based on the selection probabilities by selecting a path group based on the selection probabilities of the one or more path groups, and selecting the selected path within the selected path group based on the conditional probabilities.

2. The method of claim 1, wherein assigning the flowlet to the path comprises:

selecting the selected path group based on the selection probabilities of the one or more path groups, wherein the selection probability of a shortest length path group is checked first and the selection probability of a next-shortest length path group is checked only if the shortest length path group is not selected;

wherein the selection probability of each path group is checked, in order of increasing length path group, until a path group is selected or a longest length path group is selected.

3. The method of claim 1, wherein assigning the flowlet to the selected path further comprises:

after selecting the selected path group, selecting the selected path based on the conditional probabilities of the paths within the selected path group.

4. The method of claim 1, wherein the one or more path groups are ordered in order of increasing path length, and the selection probability for a given path group is computed based on the selection probability for a next path group in the order of increasing path length.

5. The method of claim 1, wherein the selection probability of each path is determined based on both the congestion information and a path length of each path.

6. The method of claim 1, wherein the selection probability for each path is determined using a stability factor, and wherein the stability factor causes the determination of the selection probability for a given path to be dependent on a previous determination of the selection probability for the given path.

7. The method of claim 1, wherein the congestion information for each given path of the plurality of paths is obtained as a congestion metric that is determined using a congestion measurement obtained at each switch along the given path, wherein the congestion metric represents a congestion level at each given switch when the congestion measurement at the given switch falls between a first lower threshold and a second higher threshold, wherein the congestion metric is set to a value representing no congestion when the congestion measurement falls below the first lower threshold, and wherein the congestion metric is set to a value representing fully congested when the congestion measurement at the given switch falls above the second higher threshold.

8. The method of claim 7, wherein at least one of the first lower threshold or the second higher threshold is a variable threshold that is dependent on a number of flows in the given path.

9. The method of claim 1, wherein the determination of the selection probability for each path is performed using only operations at a switch of the two switches.

10. A switch in a communication network, comprising:
a storage; and
a processor configured to execute instructions stored in the storage to cause the switch to:
obtain congestion information for a plurality of paths between the switch and a destination switch, wherein each path in the plurality of paths is assigned to one of one or more path groups, and wherein each path group comprises paths of equal length;
obtain a selection probability for each path in the plurality of paths, wherein the selection probability is determined using the congestion information, wherein the selection probability is further determined for each path by computing a selection probability for each path group and computing a conditional probability for selecting each path within each path group; and
assign a flowlet to a selected path in the plurality of paths based on the selection probabilities by selecting a path group based on the selection probabilities of the one or more path groups, and selecting the selected path within the selected path group based on the conditional probabilities.

11. The switch of claim 10, wherein assigning the flowlet to the path comprises:

selecting the selected path group based on the selection probabilities of the one or more path groups, wherein the selection probability of a shortest length path group is checked first and the selection probability of a next-shortest length path group is checked only if the shortest length path group is not selected;

wherein the selection probability of each path group is checked, in order of increasing length path group, until a path group is selected or a longest length path group is selected.

12. The switch of claim 10, wherein assigning the flowlet to the path further comprises:

after selecting the selected path group, selecting the selected path based on the conditional probabilities of the paths within the selected path group.

13. The switch of claim 10, wherein the selection probability for each path is determined using a stability factor, and wherein the stability factor causes the determination of the selection probability for a given path to be dependent on a previous determination of the selection probability for the given path.

14. The switch of claim 10, wherein the congestion information for each given path of the plurality of paths is obtained as a congestion metric that is determined using a congestion measurement obtained at each switch along the given path, wherein the congestion metric represents a congestion level at each given switch when the congestion measurement at the given switch falls between a first lower threshold and a second higher threshold, wherein the congestion metric is set to a value representing no congestion when the congestion measurement falls below the first lower threshold, and wherein the congestion metric is set to a value representing fully congested when the congestion measurement at the given switch falls above the second higher threshold.

15. The switch of claim 14, wherein at least one of the first lower threshold or the second higher threshold is a variable threshold that is dependent on a number of flows in the given path.

16. The switch of claim 10, wherein the determination of the selection probability for each path is performed using only operations at the switch.

17. A non-transitory computer readable medium having instructions encoded thereon, wherein the instructions, when executed by a processor of a switch in a communication network, cause the switch to:
- obtain congestion information for a plurality of paths between the switch and a destination switch, wherein each path in the plurality of paths is assigned to one of one or more path groups, and wherein each path group comprises paths of equal length;
- obtain a selection probability for each path in the plurality of paths, wherein the selection probability is determined using the congestion information, wherein the selection probability is further determined for each path by computing a selection probability for each path group and computing a conditional probability for selecting each path within each path group; and
- assign a flowlet to a path in the plurality of paths based on the selection probabilities by selecting a path group based on the selection probabilities of the one or more path groups, and selecting the selected path within the selected path group based on the conditional probabilities.

* * * * *